US009558601B2

(12) United States Patent
Lu et al.

(10) Patent No.: US 9,558,601 B2
(45) Date of Patent: Jan. 31, 2017

(54) SYSTEM AND METHOD FOR DETECTING VEHICLE SYSTEM FAULTS

(71) Applicant: THE BOEING COMPANY, Chicago, IL (US)

(72) Inventors: Tsai-Ching Lu, Thousand Oaks, CA (US); Charles E. Martin, Westlake Village, CA (US); Alice A. Murphy, Mesa, AZ (US); Stephen C. Slaughter, Scottsdale, AZ (US); Christopher R. Wezdenko, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/695,081

(22) Filed: Apr. 24, 2015

(65) Prior Publication Data

US 2016/0314632 A1 Oct. 27, 2016

(51) Int. Cl.
*G07C 5/08* (2006.01)
*G07C 5/02* (2006.01)
(52) U.S. Cl.
CPC ............. *G07C 5/0808* (2013.01); *G07C 5/02* (2013.01)
(58) Field of Classification Search
CPC ................................ G07C 5/0808; G07C 5/02
USPC ...................................................... 701/31.9
See application file for complete search history.

(56) References Cited

U.S. PATENT DOCUMENTS

| 6,434,512 B1 | 8/2002 | Discenzo |
| 7,103,460 B1 * | 9/2006 | Breed ................. B60C 23/0408 701/29.1 |
| 2009/0234484 A1 | 9/2009 | Vacar et al. |
| 2014/0149806 A1 * | 5/2014 | Khalastchi ......... G06K 9/00496 714/49 |

FOREIGN PATENT DOCUMENTS

EP 1791047 5/2007

OTHER PUBLICATIONS

Wheeler, et al. "Aging Aircraft Wiring Fault Detection Survey"; Prepared for the Aviation Safety Program Aircraft Aging & Durability Project as part of the Wiring Fault Detection Challenge Problem. Version 1.0; NASA Ames Research Center, Jun. 2007.
"Aero Magazine; Quarter 2, 2013"; The Boeing Edge, Boeing Commercial Airplanes. Issue 50, 2013.
Ramanathan, et al. "The Final Frontier: Embedding Networked Sensors in the Soil", Center for Embedded Network Sensing, University of California, Technical Reports Series, 2006. https://escholarship.org/uc/item/28v8b7c9.

(Continued)

*Primary Examiner* — Brian P Sweeney
(74) *Attorney, Agent, or Firm* — Perman & Green, LLP

(57) ABSTRACT

A method for detecting vehicle system faults includes receiving, with a processor, a plurality of sensor signals from one or more sensors; thresholding, with the processor, the plurality of sensor signals for each respective sensor substantially in real time; and generating, with the processor, abnormal derivative frequency values for each of the plurality of thresholded sensor signals in real time and determining an operational status of at least each of the one or more sensors based on the abnormal derivative frequency values.

20 Claims, 8 Drawing Sheets

(56) References Cited

OTHER PUBLICATIONS

Ramanathan, et al. "Rapid Deployment with Confidence: Calibration and Fault Detection in Environmental Sensor Networks" Center for Embedded Network Sensing, University of California, Technical Reports Series, 2006. https://escholarship.org/uc/item/8v/26b5qh.
Saybani, et al. "Anomaly Detection and Prediction of Sensors Faults in a Refinery Using Data Mining Techniques and Fuzzy Logic" Scientific Research and Essays, vol. 6 Issue 27, pp. 5685-5695, Academic Journals Nov. 2011. http://www.academicjournals.org/ SRE ISSN 1995-2248.
Sharma, et al. "Sensor Faults: Detection Methods and Prevalence in Real-World Datasets" ACM Journal, pp. 1-34.
Subramaniam, et al. "Outline Outlier Detection in Sensor Data Using Non-Parametric Models" Very Large Database Endowment (VLDB), Sep. 2006, Korea, ACM 1-59593-385-9/06/09.
Extended European Search Report; Dated Sep. 22, 2016, EP Application No. EP 16166800.9.

* cited by examiner

SYSTEM AND METHOD FOR DETECTING VEHICLE SYSTEM FAULTS

This invention was made with Government support under W911W6-13-2-0007 awarded by Department of Defense—Army. The government has certain rights in this invention.

BACKGROUND

The vast majority of conventional aircraft prognosis and diagnosis assumes that the sensor-wiring-processor pipeline is operating correctly and instead focuses on detecting failures of the components that are being measured. Generally where sensor failure is addressed the sensor fault detection falls into one of four categories such as knowledge driven methods, estimation methods, time-series analysis based methods, and machine learning based methods. Knowledge driven rely strictly on domain knowledge in order to pace rules/constraints on the sensor values. This class of methods can often detect more subtle faults, with "low intensity" signatures than the other three categories noted above however, because the knowledge-driven methods are not data driven they tend to be less robust in that they exhibit more false negatives. Estimation methods utilize the signals from unique, but correlated sensors in order to detect abnormalities. While these estimation methods do not necessarily require completely redundant sensors, they do require that a significantly strong correlation exist between two different sensors at the very least and that the fault does not exist far enough downstream from the sensors such that both sets of recorded measurements (sensor signals) are affected. These downstream faults that affect both sensor signals can happen, for example, if there is a fault at the wiring or processor stage. Time-series analysis based methods make use of temporal correlations among current and past measurements from a single sensor in order to predict future measurements. The time-series analysis based methods rely on a pre-defined fixed model structure with adaptable parameters, such as the well-known Autoregressive-Moving-Average (ARMA) class of models, however, the time-series analysis based methods are less robust than machine learning approaches due to their reliance on a fixed, pre-defined model. Machine learning based approaches infer a model of normal versus abnormal sensor measurements using training data, and then statistically detect and identify classes of faults. This is the most robust class of fault detection methods owing to its purely data-driven approach. However, the machine learning based approaches require the most data to train and tend to be less capable of picking up on failures that induce subtle "low intensity" signals.

Most conventional diagnostic algorithms onboard vehicles, such as aircraft, only issue fault messages when recorded sensor measurements enter abnormal ranges or exhibit "wild" dynamics. As such, most of the conventional fault diagnostic algorithms, such as those included in the fault detection methods described above, will not issue appropriate fault messages in response, and therefore vehicle operators and maintenance crew remain unaware that there is an impending failure.

SUMMARY

Accordingly, a system and method, intended to address the above-identified concerns, would find utility.

One example of the present disclosure relates to a method for detecting vehicle system faults includes receiving, with a processor, a plurality of sensor signals from one or more sensors; thresholding, with the processor, the plurality of sensor signals for each respective sensor substantially in real time; and generating, with the processor, abnormal derivative frequency values for each of the plurality of thresholded sensor signals in real time and determining an operational status of at least each of the one or more sensors based on the abnormal derivative frequency values.

One example of the present disclosure relates to a fault detection system includes a processor configured to receive a plurality of sensor signals from one or more sensors; a thresholding module connected to the processor and configured to threshold the plurality of sensor signals for each respective sensor in substantially real time; and an abnormal derivative computation module connected to the processor and configured to determine abnormal derivative frequency values for each of the plurality of thresholded sensor signals in substantially real time; wherein the processor is configured to determine an operational status of at least each of the one or more sensors based on the abnormal derivative frequency values.

One example of the present disclosure relates to a fault detection system includes: a plurality of sensors disposed in one or more vehicle systems of an aerospace, marine or land-based vehicle; and a processor configured to receive a plurality of sensor signals from the plurality of sensors, the processor being configured to threshold the plurality of sensor signals for each respective sensor in substantially real time, determine abnormal derivative frequency values for each of the plurality of thresholded sensor signals in substantially real time, and determine an operational status of at least each of the one or more vehicle systems based on the abnormal derivative frequency values.

BRIEF DESCRIPTION OF THE DRAWINGS

Figure 1:
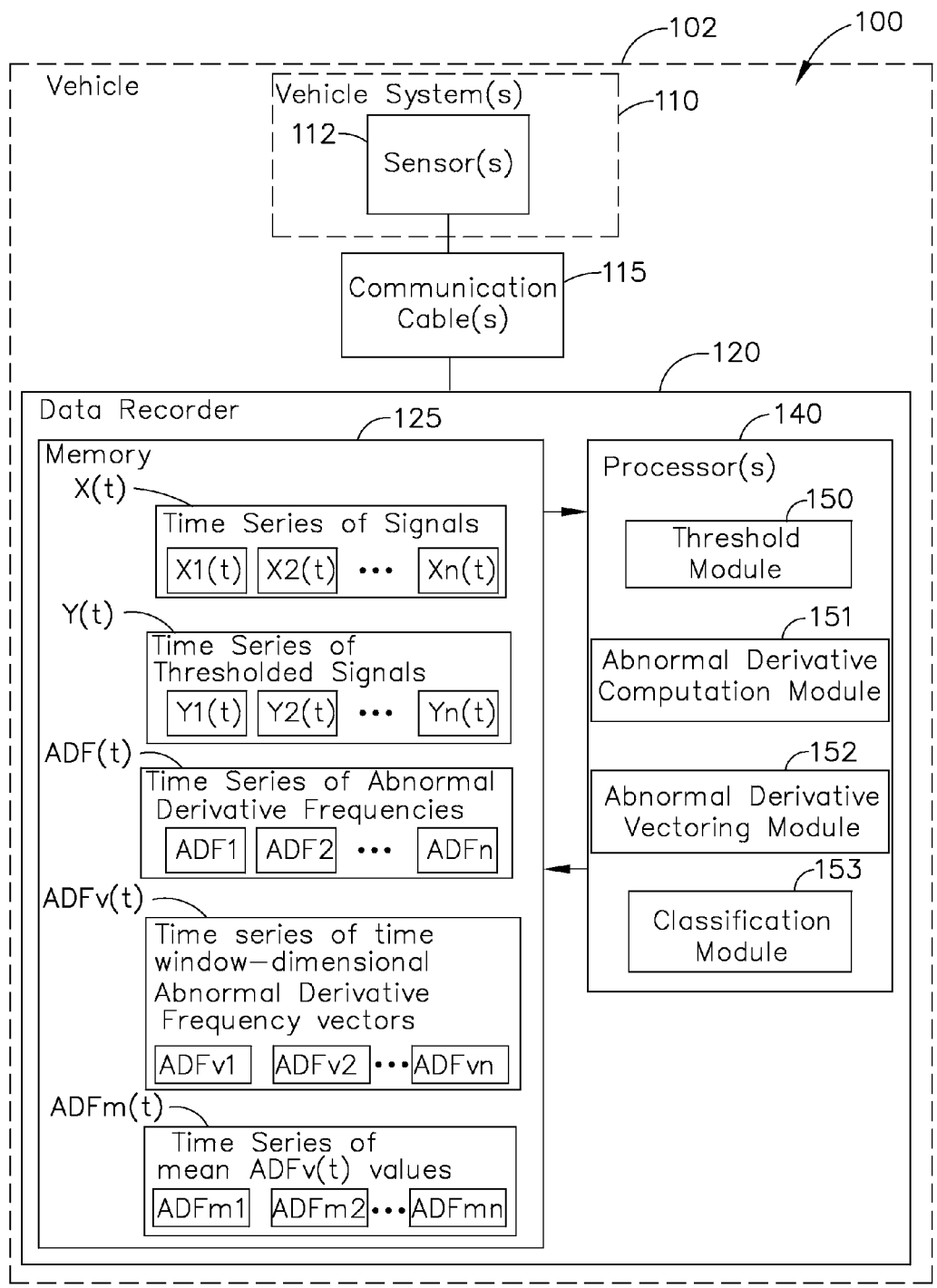
Figure 2:
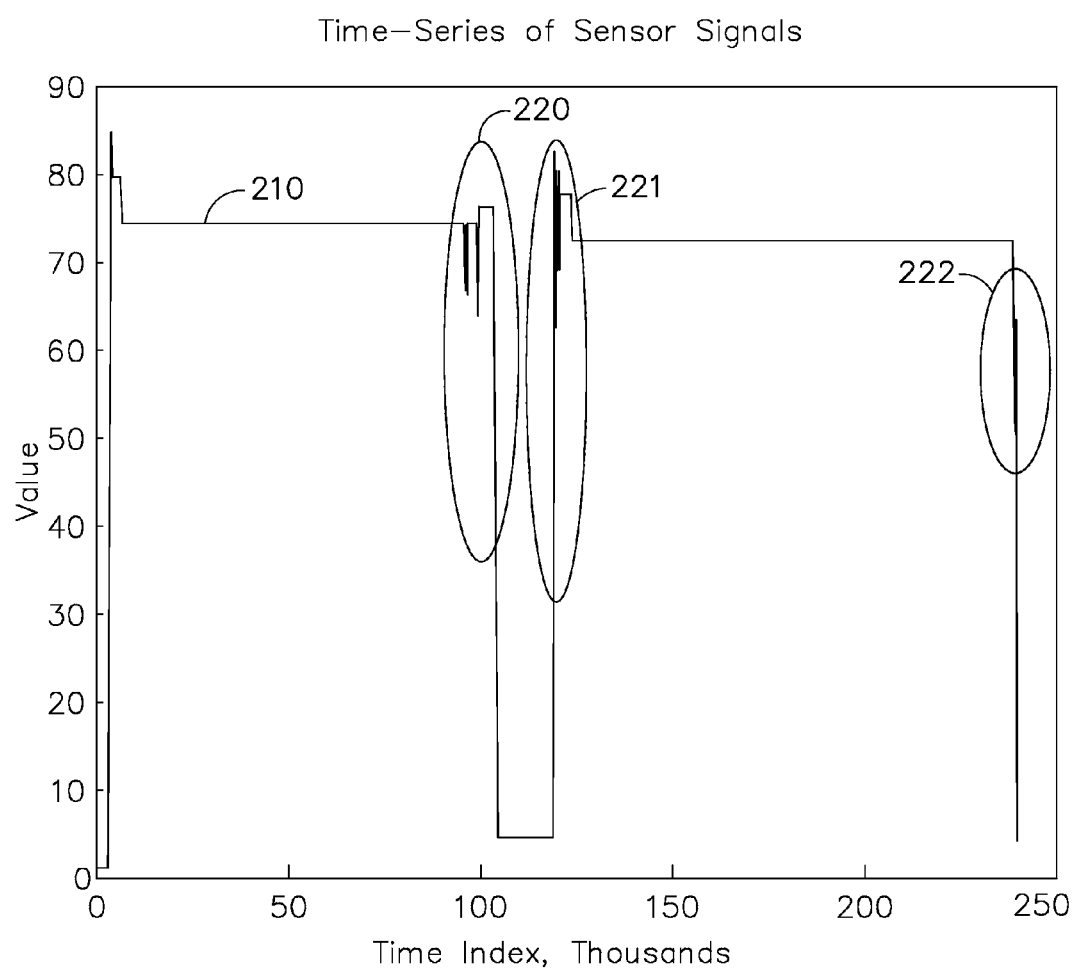
Figure 3A:
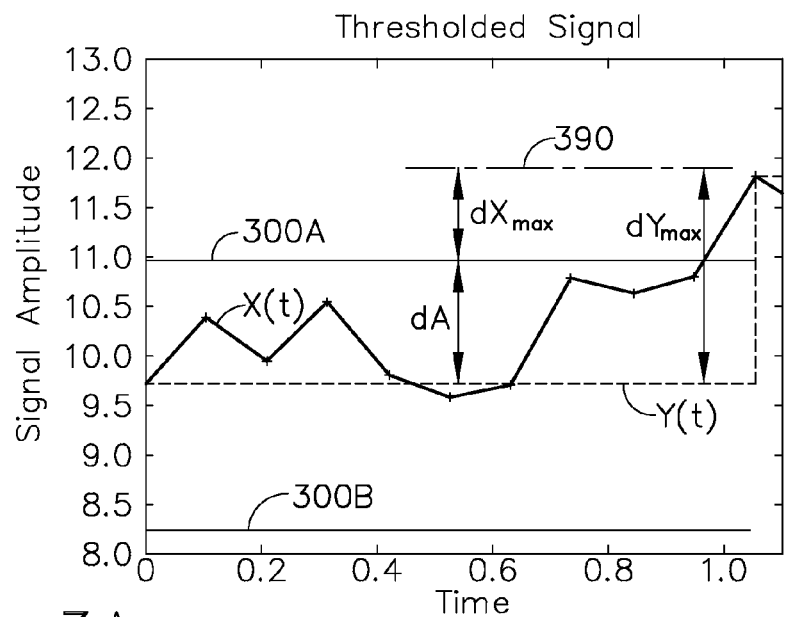
Figure 3B:
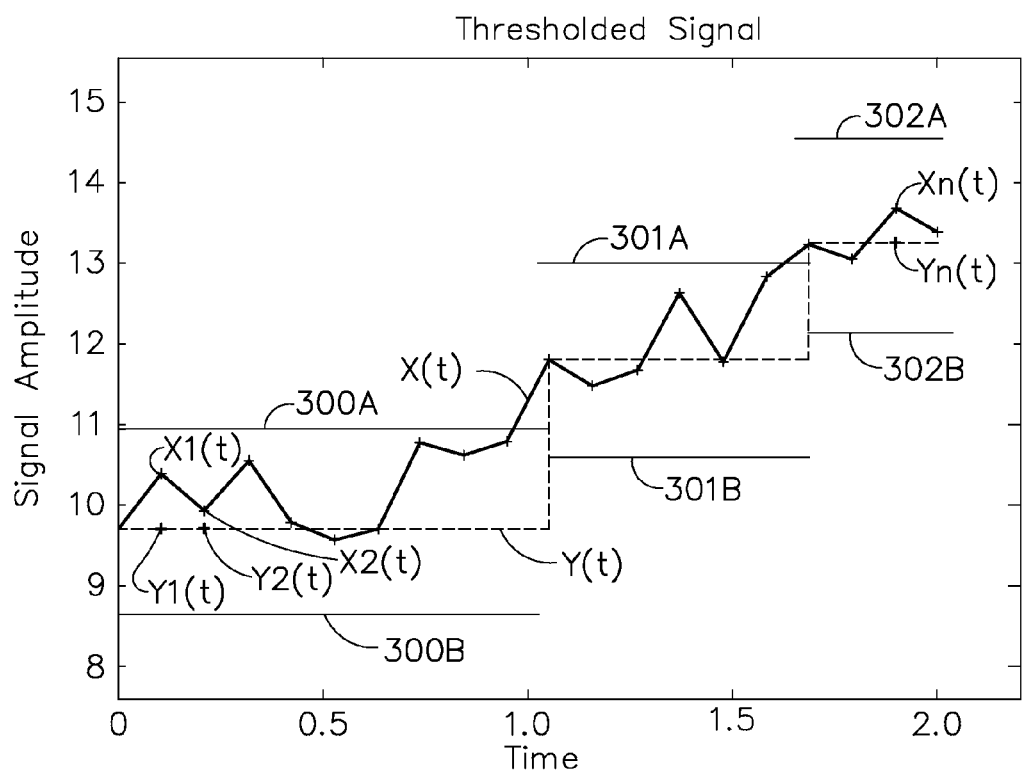
Figure 4:
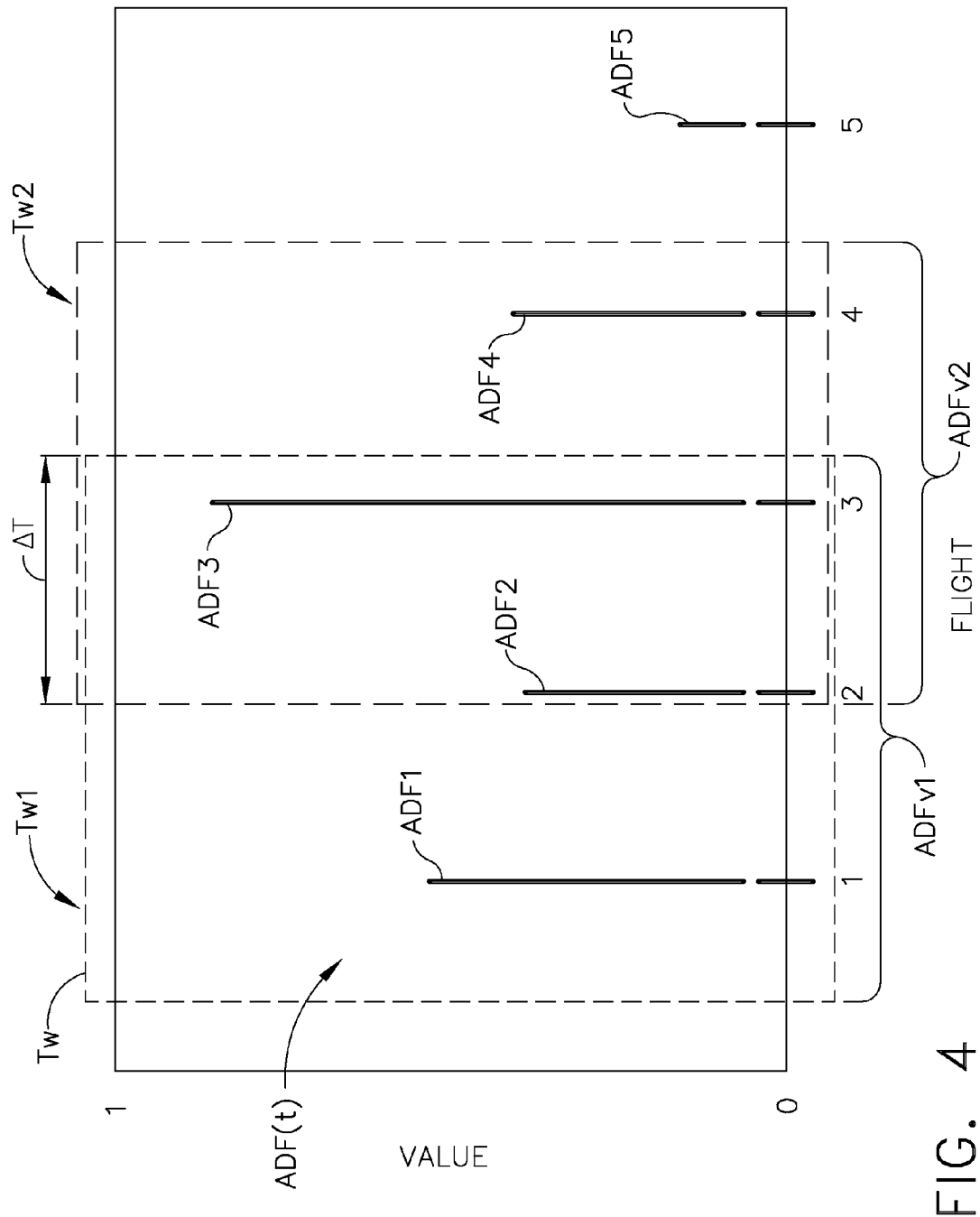
Figure 5A:
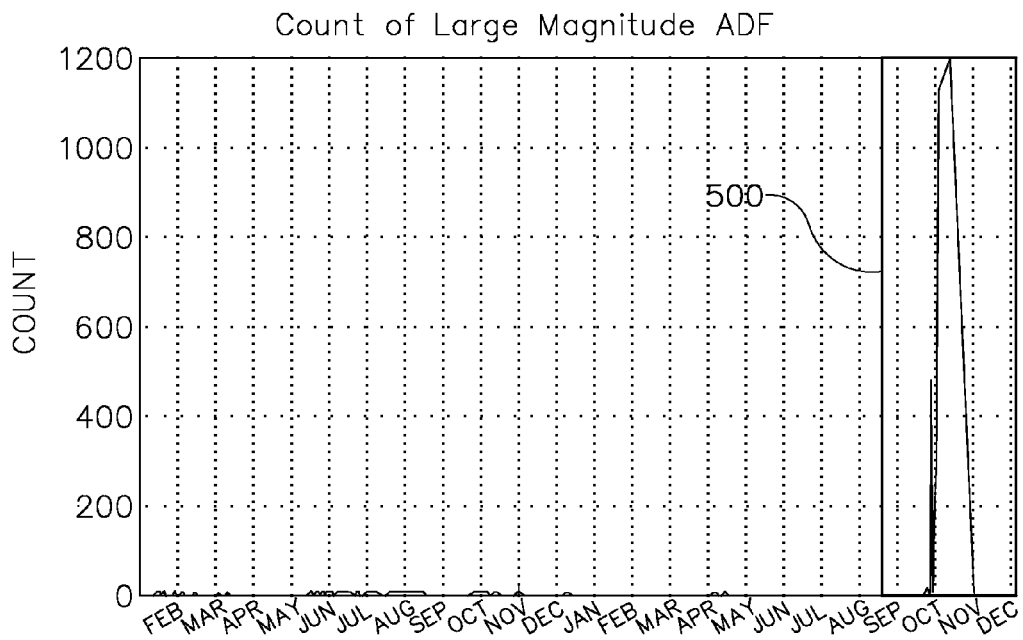
Figure 5B:
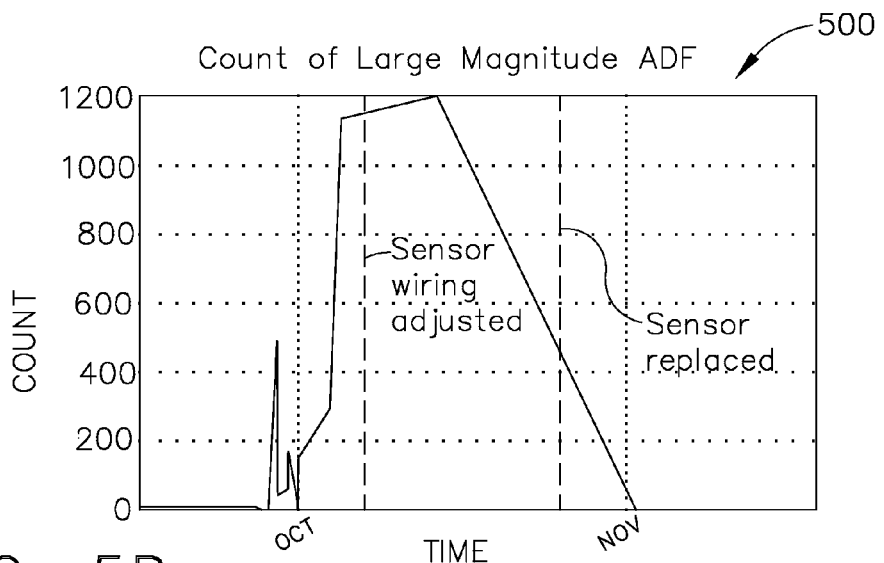
Figure 6:
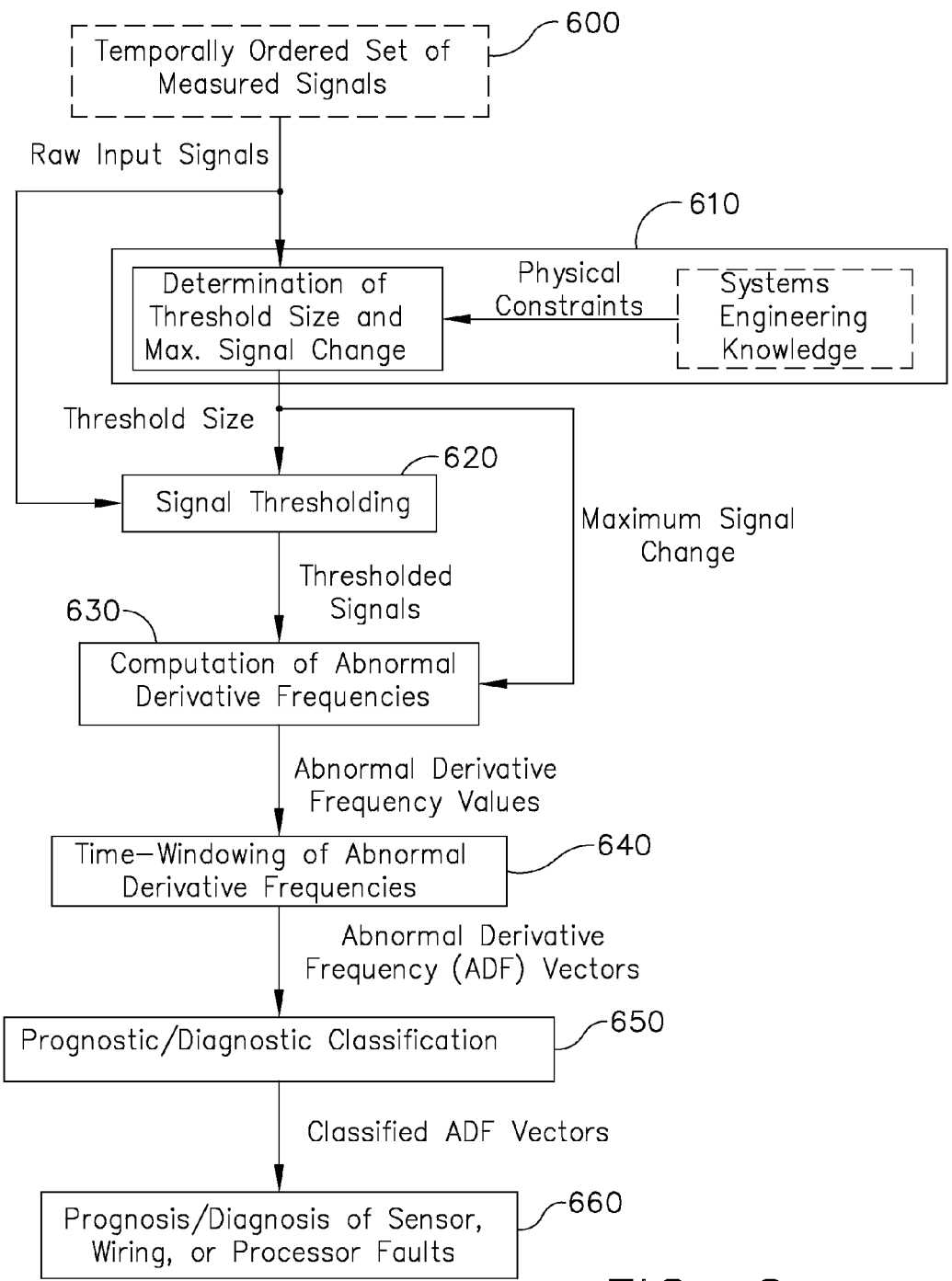
Figure 7:
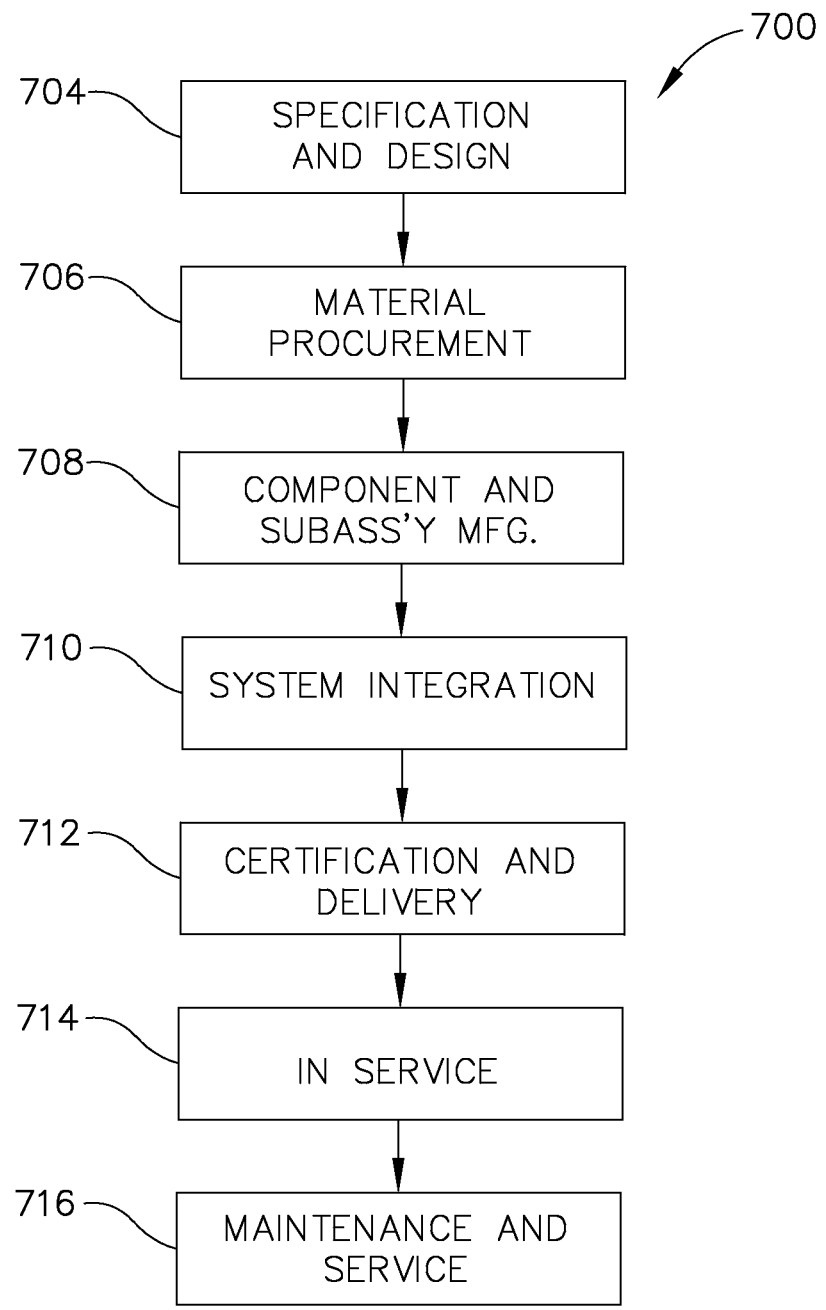

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a vehicle system fault detection system, according to one aspect of the present disclosure;

FIG. 2 is a schematic illustrations of a time series of sensor signals indicative of signal abnormalities, according to one aspect of the disclosure;

FIGS. 3A and 3B are schematic illustrations of a time series of sensors signals and thresholding procedure, according to one aspect of the disclosure;

FIG. 4 is a graph illustrating a time series of abnormal derivative frequencies, according to one aspect of the disclosure;

FIGS. 5A and 5B illustrate a graph of a time series of abnormal derivative frequency vectors, according to one aspect of the disclosure where FIG. 5B is a zoomed portion of FIG. 5A;

FIG. 6 is a flow diagram for a method of vehicle system fault detection, according to an aspect of the disclosure;

FIG. 7 is a flow diagram of aircraft production and service methodology; and

Figure 8:
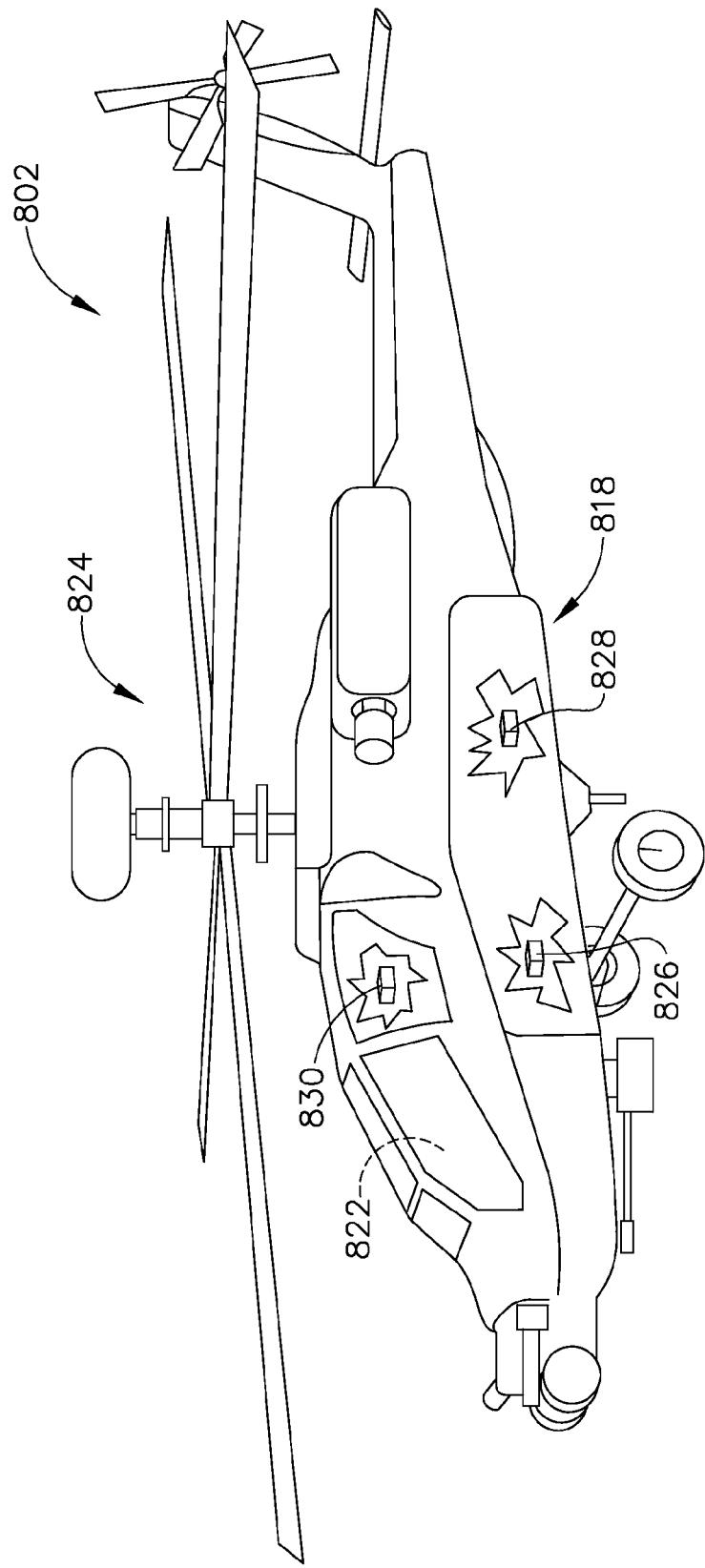

FIG. 8 is a schematic illustration of an aircraft including distributed vehicle systems.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring to FIG. 1, the aspects of the fault detection system 100 provide for predicting and diagnosing sensor, wiring and processor faults in any suitable vehicle 102, such as a fixed wing aircraft, rotary wing aircraft, spacecraft, marine vessel and/or land based vehicle. The aspects of the fault detection system 100 accept a time series of sensor signals X(t) (e.g. raw sensor signals that are, for example, 1 dimensional or scalar values) as an input and uses the time series of sensor signals X(t) to generate a prediction or diagnosis as to the health of the sensors, wiring or processor, which are responsible for measuring, transmitting and recording data about the vehicle 102 environment and operational states.

The aspects of the present disclosure includes coupling systems engineering knowledge in the form of physical constraints (such as, for exemplary purposes only, knowledge that the temperature of a fluid in a predetermined part of the vehicle being monitored cannot change more than a predetermined amount in a given time period) with empirical observations of sensor measurements or signals to define a set of parameters for a signal thresholding technique that will be described in greater detail below. The thresholding technique is employed to eliminate noise and to reduce the complexity of the time series of sensor signals X(t) (e.g. making the sensor signals easier to interpret). The thresholding technique also reduces the onboard storage (e.g. memory) requirements of the vehicle 102 and reduces the computational burden of subsequent analysis of the sensor signals.

An abnormal derivative frequency (ADF, which is described in greater detail below) is determined for each sensor signal/measurement $X1(t)$, $X2(t)$, ..., $Xn(t)$ of the thresholded time series of sensor signals X(t) where the ADF is able to capture subtle (e.g. spatially based and sensitive to small differences), intermittent (e.g. time based/temporal) instabilities in recorded sensor signals, which are indicators of problems in the sensor (e.g. measurement)-communication (e.g. wiring or communication cables)-processor (e.g. data recording) pipeline. As used herein the term "subtle" pertains to recorded sensor signals/measurements that do not leave normal ranges, but instead only exhibit transient instabilities in their dynamics (e.g. such as intermittent spikes or noise in the sensor signals). Such transient instabilities, such as transient instabilities 220, 221, 222 of sensors signal 210 illustrated in FIG. 2, often go undetected by conventional prognosis and health management methods. The aspects of the present disclosure use the detection of the transient instabilities 220, 221, 222 in the dynamics of recorded sensor signals/measurements 210 to predict faults.

In the aspects of the present disclosure a time series of ADF values is divided into overlapping intervals, called ADF vectors ADFv1, ADFv2, ..., ADFvm, by "sliding" a time window Tw of a fixed length across the time series. The ADF vectors are classified as being indicative of normal or abnormal operation of the sensor-communication-processor pipeline where the ADF vectors are used to predict impending faults and identify the root cause as a sensor, communications or processor problem. As will be described below, the ADF and the ADF vectors, in one aspect, allow for the use of simple classifiers (e.g. normal and abnormal classifications) where the mean values in an ADF vector are employed to obtain a scalar value that is compared against a predetermined threshold.

The aspects of the system and methods of the present disclosure are a hybrid between knowledge-driven and machine learning based fault detection methods. The knowledge-driven component of the aspects of the present disclosure is incorporated through the systems engineering knowledge and empirical observations used to set the thresholding parameters (e.g. such as a thresholding size and maximum possible signal change for a given time period). The aspects of the present disclosure utilize machine learning to classify the time series data (e.g. such as the ADF vectors) that consist of features extracted by the knowledge-driven component. By combining these approaches from the aspects of the disclosed embodiment are capable of detecting the subtle transient signatures of failure while remaining robust to changing operation regimes and system conditions. The aspects of the present disclosure also do not require any additional equipment or sensors be added to the vehicle 102 in order to perform the prognosis and diagnostics of the sensors and related infrastructure already within the vehicle 102, nor do the aspects of the present disclosure require detailed statistical modeling of the normal and abnormal dynamics in the time series of sensor signals.

Referring again to FIG. 1, the fault detection system 100 and methods described herein are employed in the vehicle 102. The vehicle includes one or more vehicle systems 110 (e.g. such as hydraulic systems, electrical systems, environmental systems, etc.) where each of the vehicle systems 110 includes one or more sensors 112. The one or more sensors 112 are connected to any suitable data recorder 120 (such as for example, a maintenance data recorder of the vehicle 102) in any suitable manner, such as through a wired or wireless connection. For example, the one or more sensors 112 are connected to the data recorder 120 by one or more communication cables 115 which may be wires, fiber optic cables or any other "wired" connection. The data recorder 120 may include any suitable memory 125 configured to, at least, record signals (which embody sensors measurements) of the one or more sensors 112. In one aspect the data recorder 120 includes one or more processors 140 configured to perform the methods described herein, while in other aspects the processor may be a remote processor that is connected to the data recorder in any suitable manner and/or at any suitable times (e.g. such as during operation of the vehicle or during maintenance of the vehicle) for performing the methods described herein. In one aspect the one or more processors 140 may be part of one of the vehicle systems 110 for communicating any determined faults or predicted faults to an operator or crew member of the vehicle 102.

Referring to FIGS. 1, 3A and 3B, as described above, the system and methods described herein employ thresholding to simplify raw sensor signals, such as the time series of sensor signals X(t) however, in other aspects thresholding is not necessary such as where sufficient processing power and memory is provided to perform analysis of the raw sensor signals X(t) in accordance with the aspects of the present disclosure. This thresholding includes determining the size of the threshold used to simplify (which in one aspect includes compression of the signals) the time series of sensor signals X(t) and determining a maximum amount that the time series of sensor signals X(t) can change between consecutive samples, e.g. sensor signals/measurements $X1(t), X2(t), \ldots, Xn(t)$ which are taken/received any suitable predetermined time intervals. For example, dA represents the threshold size and dXmax represents the maximum possible change in the time series of sensor signals X(t) over a single time step (which in one aspect is in units of seconds per sample or any other suitable units). As can be seen in FIGS. 3A and 3B the time series of sensor signals X(t) represents the original raw input sensor signals, Y(t) represents the thresholded version of the time series of sensor signals X(t) and lines 300A, 300B, 301A, 301B, 302A, 302B are pairs of upper and lower threshold limits that are spaced a distance dA from the value of the thresholded signal Y(t). The largest possible change in the thresholded signal Y(t) between consecutive sensor signals/measurements $X1(t), X2(t), \ldots, Xn(t)$ (e.g. samples) can be defined as $$dY\text{max}=dA+dX\text{max} \quad [1]$$

The largest possible change in the thresholded signal between consecutive sensor signals/measurements $X1(t), X2(t), \ldots, Xn(t)$ occurs in the case where the value of the input raw sensor signal X(t) is at one of the threshold values and the subsequent change in the signal X(t) takes the signal X(t) outside the threshold boundary region (as defined by the upper and lower limits 300A, 300B, 301A, 301B, 302A, 302B for each respective section of the thresholded signal Y(t)) and is of magnitude dXmax. The line 390 in FIG. 3A illustrates, for example, the largest possible (positive) change that can be observed in the thresholded signal over a single time step.

In one aspect the threshold size dA is larger than dXmax so that adequate complexity reduction and noise removal of the input time series of sensor signals X(t) is obtained. It is noted however, that if dA is too large the salient dynamics in the input signal may be lost and as such the complexity reduction versus signal fidelity are made on a case-by-case basis (e.g. the value of the threshold size dA depends on, for example, sensor specifications and/or vehicle system sensitivity). The magnitude of the maximum possible change dXmax in the time series of sensor signals X(t) is determined through a combination of systems engineering knowledge and empirical sensor observations. For example, knowledge regarding the physical constraints of the vehicle system being observed (i.e. measured), and for which the input signal is derived, is employed to put upper and lower bounds on dXmax (for example, where an oil temperature is being measured system knowledge that the oil temperature cannot change more than 5 degrees is used to set the upper and lower bounds of dXmax to ±5 degrees). This value of dXmax is then refined using the sensor signals/measurements $X1(t), X2(t), \ldots, Xn(t)$ during operation of the vehicle system 110 under actual operating conditions of the vehicle 102.

In one aspect, where thresholding is employed, the time series of sensor signals X(t) is passed through a thresholding function, such as provided by a threshold module 150 of processor 140, to remove noise and generate a signal that requires less memory to store and is easier to interpret. This thresholding scheme is illustrated in FIG. 32. In one aspect the thresholding scheme is a relative thresholding scheme but in other aspects any suitable thresholding scheme may be used. The first pair of upper and lower threshold limits 300A, 300B are centered around a first measured point of the time series of sensor signals X(t) (which spans from time units 0 to about 1.0) where the thresholded signal Y(t) is indicated at an amplitude of about 9.8 for exemplary purposes only. As long as the time series of sensor signals X(t) remains within the bounds of the upper and lower threshold limits 300A, 300B (e.g. which span from time units 0 to about 1.0) the thresholded signal Y(t) will remain at about 9.8. Just prior to about time unit 1.0 the time series of sensor signals X(t) crosses the threshold boundary initiating the next pair of upper and lower threshold limits 301A, 301B as well as initiating a shift in the value of the thresholded signal. The next measured point of the time series of sensors signals X(t) (which spans from about time unit 1.0 to about time unit 1.7, or shortly after about time unit 1.5) where the thresholded signal Y(t) is indicated at an amplitude of about 12. As long as the time series of sensor signals X(t) remains within the bounds of the upper and lower threshold limits 301A, 301B the thresholded signal Y(t) will remain at about 12. The next transition in threshold amplitude occurs at about time unit 1.7 or shortly after about time unit 1.5 where the thresholded signal Y(t) amplitude shifts to about 13 and the upper and lower threshold limits 302A, 302B are shifted relative to the shifted thresholded signal Y(t). As long as the time series of sensor signals X(t) remains within the bounds of the upper and lower threshold limits 302A, 302B the thresholded signal Y(t) will remain at about 13. This process continues in a similar manner until the vehicle 102 is shut down or until such a time where the measurement of the vehicle system 110 being monitored is halted.

The feature that is extracted from the thresholded sensor signal Y(t) is the frequency of one-step time-derivatives that are too large in magnitude (e.g. extend above or below the thresholding limits). For example, as noted above, based on systems engineering knowledge and empirical sensor observations the magnitude of any one-step time-derivative of Y(t) should not exceed dYmax (see equation [1] above). An abnormally large change in Y(t) indicates an error in either the measurement/sensor signal itself (e.g. a sensor fault) or an error downstream in the recording of the sensor signal/measurement (e.g. a communications or processor fault). Computation of the ADF, by for example, an abnormal derivative computation module 151 of processor 140, is performed to identify the changes in Y(t). For example, to compute the ADF each consecutive pair of points of thresholded sensor signals Y1(*t*), Y2(*t*), . . . , Yn(t) (which correspond to the points X1(*t*), X2(*t*), . . . , Xn(t) of the raw sensor signals) the magnitude of the change in value is recorded. Due to the discrete nature of the time series of thresholded signals Y(t) there may be many zero-valued derivatives and as such, only the non-zero derivatives are counted. The count of non-zero derivatives is denoted by Ntotal. The count of derivatives with magnitudes that exceed dYmax is denoted by Nabnormal. The ADF is, in one aspect, then defined as a normalized value between 0 and 1 where $$ADF = Nabnormal/Ntotal \quad [2]$$

In other aspects, the ADF is defined as $$ADF = Nabnormal/Ttotal \quad [3]$$

where Ttotal is a total time duration such as, for example, a single flight, a predetermined number of flights, or any other predetermined time period.

As such the ADF is computed for a predetermined quantity of time, e.g. based on a predetermined sampling scheme, such as for example, a predetermined number of flights of the vehicle (or where the vehicle is a marine vessel or land based vehicle a predetermined number of voyages or trips) or any other suitable sampling scheme such as hours, days, weeks, etc. of vehicle operation. Accordingly a time series of ADFs denoted by ADF(t) is generated as illustrated in FIG. 4 for each predetermined quantity of time. The examples provided herein are the vehicle 102 is an aerospace vehicle such that an ADF is computed for each flight of the vehicle 102 to form the time series ADF(t) where ADF(t) is a one-dimensional time series of ADF values (e.g. ADF1, ADF2, . . . ADFn).

Referring to FIGS. 1, 4, 5A and 5B, in one aspect the ADF values are transformed to vector values by, for example, an abnormal derivative vectoring module 152 of processor 140. Here a time window Tw (e.g. that characterizes a time series having any suitable duration) is provided where a size of the time window Tw includes a predetermined number of flights. For exemplary purposes only the time window Tw illustrated in FIG. 4 is shown in two positions Tw1, Tw2 where the time window has a size of 3 flights of the vehicle 102 for exemplary purposes only. In other aspects the time window Tw may have a size that is larger or smaller than 3 flights of the vehicle 102. As noted above, an ADF is computed for each flight such that for each time window position Tw1, Tw2 a time window dimensional vector (e.g. an ADF vector) ADFv1, ADFv2, . . . , ADFvm (where m<=n) exists that includes the temporally ordered ADF values, where each ADF value is between 0 and 1 as noted above. Here the entire time series ADF(t) of ADF values, or in other aspects a portion of the time series ADF(t), is transformed into a time series of time window dimensional vectors ADFv(t) in any suitable manner such as by, for example, averaging the values of the ADFs included each movement or step of the time window Tw, where ADFv(t) is a time series of time window dimensional (Tw-dimensional) ADF vectors. For exemplary purposes time window Tw positioned in the first window position Tw1 includes three ADF values (e.g. ADF1, ADF2, ADF3 corresponding respectively to flights 1, 2, 3) which are averaged to obtain the time window dimensional vector ADFv1 for time window position Tw1. The time window Tw is moved by any suitable step size ΔT (which in this example is one flight) to the second window position Tw2 so as to include three ADF values (e.g. ADF2, ADF3, ADF4 corresponding respectively to flights 2, 3, 4) and so on to so that the time series of time window dimensional vectors ADFv(t) is computed. In one aspect. The step size ΔT in this example, is smaller than the size of the time window Tw but in other aspects the step size may be the same size as the time window or larger than the time window. As will be described below, a time series of mean values of the time window dimensional vectors ADFv(t) can be calculated and be denoted by ADFm(t) where ADFm(t) is a one-dimensional time series defined by mean (ADFv(1)), mean (ADFv(2)), . . . , mean(ADFv(n)).

It is noted that the presence of a non-zero value for an ADF over the course of, for example, a flight of the vehicle 102 is not necessarily an indicator of a sensor, communication or processor problem/fault. For example, in some systems it is normal to have one or more abnormal derivatives when the system is powered down or powered up. Further, in some aspects, a small value for an ADF may be acceptable and not warrant maintenance actions (e.g. such as were the ADF is within the upper and lower threshold limits 300A, 300B, 301A, 301B, 302A, 302B). As such, to account for the acceptability of some abnormal ADF values the windowed ADF samples (e.g. the time window dimensional vectors ADFv of the time series ADFv(t)) are classified where the time window dimensional vectors ADFv are indicators of conditions that are likely to require maintenance actions (e.g. an abnormal classification) and those that are not (e.g. a normal classification).

The time series of time window dimensional vectors ADFv(t) or the time series of mean values ADFm(t) are classified by, for example, a classification module 153 of processor 140 in any suitable manner such as by support vector machines, neural networks, random decision forests, logical regression, etc. Here, the classification module 153 includes a trained classifier that distinguishes between normal and abnormal sensor, communication and processor operation based on, for example, thresholding of the time series of time window dimensional vectors ADFv(t) or time series of mean values ADFm(t). In one aspect, the classifier is pre-trained using time window dimensional vectors ADFv (of time series ADFv(t)) or mean values ADFm (of the time series ADFm(t)) that are known to be generated from normal and abnormal operating conditions of the vehicle 102. In one aspect, there is training data that pertains to wiring faults, sensor faults, processor faults and no faults so that the processor classifies a fault as being normal or abnormal and then further determines whether the fault pertains to wiring, a sensor or a processor. For example, wiring faults are identified by the processor from the time series of ADF values (either the vector valued version or scalar valued version) where wiring faults exhibit bursts of abnormally large time derivatives and sensor or processor faults exhibit intermittent abnormal derivatives. In one aspect, the size of the time window Tw is adjusted to a size that allows for the detection of the wiring, sensor or processor faults (for example, the size of the time window Tw may be reduced from a number of flights to a number of seconds, a number of minutes, a number of hours, etc.). In one aspect, the abnormal derivative frequency ADF allows for the classification of the time window dimensional vectors ADFv in the time series ADFv(t) by taking the mean value ADFm of the components within each time window dimensional vector ADFv to obtain ADFm(t) and using a thresholding scheme on the mean values ADFm(t) (e.g. upper and lower limits similar to those described above with respect to FIGS. 3A and 3B) based on, for example, data driven factors (such as using time window dimensional vectors ADFv(t) that are known to be generated from normal and abnormal operating conditions of the vehicle 102) to determine the normal and abnormal classification of the time window dimensional vectors ADFv(t). As described herein, the ADF vectors allow for simple classification schemes such as for example, taking the mean values ADFm(t) in the time window dimensional vectors ADFv(t), which would result in a scalar-valued time-series rather than a vector-valued time series (e.g. a multidimensional analysis is reduced to a one-dimensional analysis), an example of which is provided below. Based on the known training data a threshold (determined by the scalar-valued time-series) that maximizes an objective function, such as the accuracy of classifying a fault, is determined as described herein.

In operation, a method for detecting vehicle system faults includes (with reference to FIG. 6) obtaining a temporally ordered set (X(t) of measured input sensor signals X1($t$), X2($t$), . . . , Xn(t) where Xi(t) was recorded prior to Xj(t) where i<j (FIG. 6, Block 600). In the method described herein, each signal is sampled from the same sensor at the same fixed sampling rate (e.g. the method is performed for each sensor/sensor signal) in real time (e.g. obtained and analyzed in a time frame on the order of milliseconds or microseconds and not stored in or replayed from a memory for analysis, where real time implies an operational deadline from an event to a system response). It is noted that, in one aspect, the processing described herein and any combination of data acquisition and processing as described herein is performed in real time. As described herein, the signals X1($t$), X2($t$), . . . , Xn(t) from an individual sensor 112 are measured over any suitable predetermined time period, such as during a single flight or a portion of a flight, or more than one flight, etc. A plurality of thresholding parameters are derived from physical constraints from systems engineering knowledge and empirical observations with respect to the previously obtained sensor signals in the manner described herein (FIG. 6, Block 610). Each input sensor signal X1($t$), X2($t$), . . . , Xn(t) is transformed in real-time by thresholding (FIG. 6, Block 620) as described above using one or more of the thresholding parameters to produce a thresholded time series of signal Y(t) including thresholded signals Y1($t$), Y2($t$), . . . , Yn(t). As noted above, the thresholding reduces storage requirements, makes the signal less complex and eliminates signal noise making the time series of signals Y(t) easier to interpret than the time series of signals X(t). The ADF for the time series of signals Y(t) is computed in real time as described herein to determine the time series ADF(t) (FIG. 6, Block 630). The time series ADF(t) of ADF values is windowed using time window Tw in a stepped ΔT manner, as described herein, to extract a time series ADFv(t) of ADF vectors ADFv (FIG. 6, Block 640). The ADF vectors ADFv are classified in real-time as described herein (FIG. 6, Block 650) and a measure of the health of the sensor 112 system or pipeline (e.g. the sensor, communications and processor) and/or prognosis of a remaining useful life of the sensor system is determined in real-time based on the ADFs in the classified ADF vectors ADFv (FIG. 6, Block 660). While the classification of the faults based on the ADF values is described herein as being in real time in other aspects the classification of the faults based on the ADF may be performed on stored data at any suitable time after the sensor signals are received.

As an operational example, referring to FIGS. 5A and 5B (which is a zoomed in portion of FIG. 5A corresponding to highlighted area 500), the system and methods described herein have been applied to the oil temperature of a transmission system of the vehicle 102. The operational example focused on a class of faults that manifest as intermittent with abnormal variability, but do not result in sensor measurement or recorded values exceeding normal ranges (e.g. a fault message is not triggered). It is noted that the lack of system-generated messages with respect to this class of faults is difficult for vehicle operators and maintenance personnel to recognize the onset of sensor, wiring or processor problems. In the operational example, the threshold size dA and the maximum magnitude the sensor signals could change between consecutive samples dXmax was determined in the manner described herein. The threshold size and maximum signal change were determined using a combination of system engineering knowledge from the vehicle 102 maintenance support documentation and empirical observations of the oil temperature during actual vehicle operation. In this particular operational example, the threshold size dA was set to about 16 degrees and the maximum magnitude the sensor signals could change between consecutive samples dXmax was set to about 18 degrees. The raw sensor signals were thresholded as described herein. It is noted that for this class of faults the magnitude of the sensor signals is often uninformative so the ADF values for each flight of the vehicle 102 were computed where the ADF values allow for analyzing the salient features of the sensor signals. A time window Tw of three consecutive flights was long enough to account for the variability observed in the DF values. Further, due to the effectiveness of the ADF feature the mean ADFv value per time window was used as a threshold for the classification of the ADF vectors ADFv. In this operational example, the temperature threshold was set to about 0.2 based on the mean ADFv value per time window. A prediction of an oil temperature failure was made two weeks prior to the sensor failing to the point where the sensor was replaced. This prediction was made by observing the increase in the ADF value for the sensor leading up to the replacement of the sensor. FIGS. 5A and 5B illustrate the sensor prognosis by showing a plot of the numerator of the ADF values versus the date (the numerator of an ADF value, as described above, is the total number of abnormal derivative observed) which is shown as an example of how large the number of abnormal derivatives can get without the vehicle 102 issuing any related fault messages. Each point on the plots in FIGS. 5A and 5B represents a single vehicle power-up with flight. As can be seen in FIG. 5B the sensor problems begin in late September. In early October the sensor wiring was adjusted in an attempt to remedy the problem however, from the analysis of the ADF values it is clear that the sensor problem continues, which suggests a sensor problem rather than a wiring problem. Subsequently the sensor was replaced and the problem subsided.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 700 as shown in FIG. 7 and an aircraft 802 as shown in FIG. 8. During pre-production, illustrative method 700 may include specification and design 704 of the aircraft 802 and material procurement 706. During production, component and subassembly manufacturing 708 and system integration 710 of the aircraft 802 take place. Thereafter, the aircraft 802 may go through certification and delivery 712 to be placed in service 714. While in service by a customer, the aircraft 802 is scheduled for routine maintenance and service 716 (which may also include modification, reconfiguration, refurbishment, and so on).

Each of the processes of the illustrative method 700 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, the aircraft 802 produced by the illustrative method 100 may include an airframe 818 with a plurality of high-level systems and an interior 822. Examples of high-level systems, which are distributed throughout the aircraft, include one or more of a propulsion system 824, an electrical power system 826, a hydraulic system 828, and an environmental system 830. Any number of other systems may be included. Although an aerospace example is shown, the principles of the invention may be applied to other industries, such as the automotive and maritime industries.

The system and methods shown or described herein may be employed during any one or more of the stages of the manufacturing and service method 700. For example, components or subassemblies corresponding to component and subassembly manufacturing 708 may be fabricated or manufactured in a manner similar to components or subassemblies produced while the aircraft 802 is in service. Also, one or more aspects of the system, method, or combination thereof may be utilized during the production states 708 and 710, for example, by substantially expediting assembly of or reducing the cost of an aircraft 802. Similarly, one or more aspects of the system or method realizations, or a combination thereof, may be utilized, for example and without limitation, while the aircraft 802 is in service, e.g., operation, maintenance and service 716.

Different examples and aspects of the system and methods are disclosed herein that include a variety of components, features, and functionality. It should be understood that the various examples and aspects of the system and methods disclosed herein may include any of the components, features, and functionality of any of the other examples and aspects of the system and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In accordance with one or more aspects of the present disclosure a method for detecting vehicle system faults includes receiving, with a processor, a plurality of sensor signals from one or more sensors; thresholding, with the processor, the plurality of sensor signals for each respective sensor substantially in real time; and generating, with the processor, abnormal derivative frequency values for each of the plurality of thresholded sensor signals in real time and determining an operational status of at least each of the one or more sensors based on the abnormal derivative frequency values.

In accordance with one or more aspects of the present disclosure the operational status of at least each of the one or more sensors includes a measure of health of a system in which the sensor is located.

In accordance with one or more aspects of the present disclosure the operational status of at least each of the one or more sensors includes a prognosis of a remaining useful life of a system in which the sensor is located.

In accordance with one or more aspects of the present disclosure the method further includes determining an operational status of wiring connecting the one or more sensors to a vehicle data recorder.

In accordance with one or more aspects of the present disclosure the method further includes determining an operational status of a vehicle data recorder connected to the one or more sensors.

In accordance with one or more aspects of the present disclosure the method further includes determining a plurality of thresholding parameters that are derived from vehicle system constraints and empirical observations of previously recorded sensor data from the one or more sensors, where the plurality of thresholding parameters effect thresholding the plurality of sensor signals for each respective sensor.

In accordance with one or more aspects of the present disclosure the thresholding eliminates noise and reduces a complexity of the plurality of sensor signals.

In accordance with one or more aspects of the present disclosure the processor determines the operational status of at least each of the one or more sensors in real-time.

In accordance with one or more aspects of the present disclosure the plurality of signals correspond to data acquisition and data communication in an aerospace, marine or land-based vehicle system with respect to an operational state of the aerospace, marine or land-based vehicle system.

In accordance with one or more aspects of the present disclosure determining an operational status of at least each of the one or more sensors includes generating a time series of abnormal derivative frequency values; and transforming the time series of abnormal derivative frequency values into abnormal derivative frequency vectors by time shifting, with overlapping time steps, a time window having a predetermined size across the time series of abnormal derivative frequency values.

In accordance with one or more aspects of the present disclosure generating the abnormal derivative frequency values includes capturing one or more of subtle and intermittent instabilities in the plurality of sensor signals.

In accordance with one or more aspects of the present disclosure the method further includes: classifying the abnormal derivative frequency values for each of the plurality of thresholded sensor signals as being normal or abnormal; and predicting, based on classified abnormal derivative frequency values, an impending fault in a component of a system in which a respective one of the one or more sensors is located.

In accordance with one or more aspects of the present disclosure the method further includes thresholding, with the processor, the abnormal derivative frequency values for each of the plurality of thresholded sensor signals to effect classification of a respective abnormal derivative frequency value.

In accordance with one or more aspects of the present disclosure a fault detection system includes a processor configured to receive a plurality of sensor signals from one or more sensors; a thresholding module connected to the processor and configured to threshold the plurality of sensor signals for each respective sensor in substantially real time; and an abnormal derivative computation module connected to the processor and configured to determine abnormal derivative frequency values for each of the plurality of thresholded sensor signals in substantially real time; wherein the processor is configured to determine an operational status of at least each of the one or more sensors based on the abnormal derivative frequency values.

In accordance with one or more aspects of the present disclosure the operational status of at least each of the one or more sensors includes a measure of health of a system in which the sensor is located.

In accordance with one or more aspects of the present disclosure the operational status of at least each of the one or more sensors includes a prognosis of a remaining useful life of a system in which the sensor is located.

In accordance with one or more aspects of the present disclosure the processor is further configured to determine an operational status of wiring connecting the one or more sensors to a vehicle data recorder.

In accordance with one or more aspects of the present disclosure the processor is further configured to determine an operational status of a vehicle data recorder connected to the one or more sensors.

In accordance with one or more aspects of the present disclosure the fault detection system further includes a threshold module connected to the processor and configured to determine a plurality of thresholding parameters that are derived from vehicle system constraints and empirical observations of previously recorded sensor data from the one or more sensors, where the plurality of thresholding parameters effect thresholding the plurality of sensor signals for each respective sensor.

In accordance with one or more aspects of the present disclosure thresholding eliminates noise and reduces a complexity of the plurality of sensor signals.

In accordance with one or more aspects of the present disclosure the processor is configured to determine the operational status of at least each of the one or more sensors in real-time.

In accordance with one or more aspects of the present disclosure the plurality of signals correspond to data acquisition and data communication in an aerospace, marine or land-based vehicle system with respect to an operational state of the aerospace, marine or land-based vehicle system.

In accordance with one or more aspects of the present disclosure the fault detection system further includes an abnormal derivative vectoring module configured to generate a time series of abnormal derivative frequency values; and transform the time series of abnormal derivative frequency values into abnormal derivative frequency vectors by time shifting, with overlapping time steps, a time window having a predetermined size across the time series of abnormal derivative frequency values.

In accordance with one or more aspects of the present disclosure the fault detection system further includes a classification module connected to the processor and configured to classify the abnormal derivative frequency values for each of the plurality of thresholded sensor signals as being normal or abnormal; and wherein the processor is configured to predict, based on classified abnormal derivative frequency values, an impending fault in a component of a system in which a respective one of the one or more sensors is located.

In accordance with one or more aspects of the present disclosure the processor is configured to threshold the abnormal derivative frequency values for each of the plurality of thresholded sensor signals to effect classification of a respective abnormal derivative frequency value.

In accordance with one or more aspects of the present disclosure a fault detection system includes: a plurality of sensors disposed in one or more vehicle systems of an aerospace, marine or land-based vehicle; and a processor configured to receive a plurality of sensor signals from the plurality of sensors, the processor being configured to threshold the plurality of sensor signals for each respective sensor in substantially real time, determine abnormal derivative frequency values for each of the plurality of thresholded sensor signals in substantially real time, and determine an operational status of at least each of the one or more vehicle systems based on the abnormal derivative frequency values.

In accordance with one or more aspects of the present disclosure the operational status of at least each of the one or more vehicle systems includes a measure of health of the one or more vehicle systems in which the plurality of sensors is located.

In accordance with one or more aspects of the present disclosure the operational status of at least each of the one or more vehicle systems includes a prognosis of a remaining useful life of the one or more vehicle systems in which the plurality of sensors is located.

In accordance with one or more aspects of the present disclosure the processor is further configured to determine an operational status of wiring connecting the one or more sensors to a vehicle data recorder.

In accordance with one or more aspects of the present disclosure the processor is further configured to determine an operational status of a vehicle data recorder connected to the one or more sensors.

In accordance with one or more aspects of the present disclosure the processor is further configured to determine a plurality of thresholding parameters that are derived from vehicle system constraints and empirical observations of previously recorded sensor data from the plurality of sensors, where the plurality of thresholding parameters effect thresholding the plurality of sensor signals for each respective sensor.

In accordance with one or more aspects of the present disclosure thresholding eliminates noise and reduces a complexity of the plurality of sensor signals.

In accordance with one or more aspects of the present disclosure the processor is configured to determine the operational status of at least each of the one or more vehicle systems in real-time.

In accordance with one or more aspects of the present disclosure the plurality of signals correspond to data acquisition and data communication in the aerospace, marine or land-based vehicle.

In accordance with one or more aspects of the present disclosure the processor is further configured to generate a time series of abnormal derivative frequency values; and transform the time series of abnormal derivative frequency values into abnormal derivative frequency vectors by time shifting, with overlapping time steps, a time window having a predetermined size across the time series of abnormal derivative frequency values.

In accordance with one or more aspects of the present disclosure the processor is further configured to classify the abnormal derivative frequency values for each of the plurality of thresholded sensor signals as being normal or abnormal; and wherein the processor is configured to predict, based on classified abnormal derivative frequency values, an impending fault in a component of the one or more vehicle systems in which a respective one of the one or more sensors is located.

In accordance with one or more aspects of the present disclosure the processor is configured to threshold the abnormal derivative frequency values for each of the plurality of thresholded sensor signals to effect classification of a respective abnormal derivative frequency value.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method for detecting vehicle system faults, the method comprising:
    detecting a predetermined characteristic of a vehicle with one or more sensors onboard the vehicle;
    obtaining a plurality of sensor signals corresponding to the predetermined characteristic from the one or more sensors;
    receiving, with a processor onboard the vehicle, the plurality of sensor signals from the one or more sensors onboard the vehicle;
    thresholding, with the processor, the plurality of sensor signals for each respective sensor substantially in real time;
    identifying transient instabilities in the dynamics of the plurality of sensor signals by generating, with the processor, abnormal derivative frequency values for each of the plurality of thresholded sensor signals in real time, where the transient instabilities are within a predetermined normal operating range of the one or more sensors, and determining an operational status of at least each of the one or more sensors based on the abnormal derivative frequency values identifying the transient instabilities; and
communicating the operational status of the one or more sensors to an operator or crew member of the vehicle.

2. The method of claim 1, wherein the operational status of at least each of the one or more sensors includes a measure of health of a system in which the sensor is located.

3. The method of claim 1, wherein the operational status of at least each of the one or more sensors includes a prognosis of a remaining useful life of a system in which the sensor is located.

4. The method of claim 1, further comprising determining a plurality of thresholding parameters that are derived from vehicle system constraints and empirical observations of previously recorded sensor data from the one or more sensors, where the plurality of thresholding parameters effect thresholding the plurality of sensor signals for each respective sensor.

5. The method of claim 1, wherein the processor determines the operational status of at least each of the one or more sensors in real-time.

6. The method of claim 1, wherein the plurality of signals correspond to data acquisition and data communication in an aerospace, marine or land-based vehicle system with respect to an operational state of the aerospace, marine or land-based vehicle system.

7. The method of claim 1, wherein determining an operational status of at least each of the one or more sensors includes
    generating a time series of abnormal derivative frequency values; and
    transforming the time series of abnormal derivative frequency values into abnormal derivative frequency vectors by time shifting, with overlapping time steps, a time window having a predetermined size across the time series of abnormal derivative frequency values.

8. The method of claim 1, further comprising:
    classifying the abnormal derivative frequency values for each of the plurality thresholded sensor signals as being normal or abnormal; and
    predicting, based on classified abnormal derivative frequency values, an impending fault in a component of a system in which a respective one of the one or more sensors is located.

9. The method of claim 8, further comprising thresholding, with the processor, the abnormal derivative frequency values for each of the plurality of thresholded sensor signals to effect classification of a respective abnormal derivative frequency value.

10. A fault detection system comprising:
    one or more sensors onboard a vehicle, the one or more sensors being configured to detect a predetermined characteristic of the vehicle and generate a plurality of sensor signals corresponding to the predetermined characteristic;
    a processor onboard the vehicle configured to receive the plurality of sensor signals from the one or more sensors;
    a thresholding module of the processor configured to threshold the plurality sensor signals for each respective sensor in substantially real time; and
    an abnormal derivative computation module of the processor configured to identify transient instabilities in the dynamics of the plurality of sensor signals by determining abnormal derivative frequency values for each of the plurality of thresholded sensor signals in substantially real time, where the transient instabilities are within a predetermined normal operating range of the one or more sensors,
    wherein the processor is configured to determine an operational status of at least each of the one or more sensors based on the abnormal derivative frequency values and communicate the operational status of the one or more sensors to an operator or crew members of the vehicle.

11. The fault detection system of claim 10, wherein the operational status of at least each of the one or more sensors includes a measure of health of a system in which the sensor is located.

12. The fault detection system of claim 10, wherein the operational status of at least each of the one or more sensors includes a prognosis of a remaining useful life of a system in which the sensor is located.

13. The fault detection system of claim 10, further comprising a threshold module connected to the processor and configured to determine a plurality of thresholding parameters that are derived from vehicle system constraints and empirical observations of previously recorded sensor data from the one or more sensors, where the plurality of thresholding parameters effect thresholding the plurality of sensor signals for each respective sensor.

14. The fault detection system of claim 10, wherein the processor is configured to determine the operational status of at least each of the one or more sensors in real-time.

15. The fault detection system of claim 10, wherein the plurality of signals correspond to data acquisition and data communication in an aerospace, marine or land-based vehicle system with respect to an operational state of the aerospace, marine or land-based vehicle system.

16. The fault detection system of claim 10, further comprising an abnormal derivative vectoring module of the processor that is configured to
generate a time series of abnormal derivative frequency values; and
transform the time series of abnormal derivative frequency values into abnormal derivative frequency vectors by time shifting, with overlapping time steps, a time window having a predetermined size across the time series of abnormal derivative frequency values.

17. The fault detection system of claim 10, further comprising a classification module of the processor configured to classify the abnormal derivative frequency values for each of the plurality of thresholded sensor signals as being normal or abnormal,
wherein the processor is configured to predict, based on classified abnormal derivative frequency values, an impending fault in a component of a system in which a respective one of the one or more sensors is located.

18. The fault detection system of claim 17, wherein the processor is configured to threshold the abnormal derivative frequency values for each of the plurality of thresholded sensor signals to effect classification of a respective abnormal derivative frequency value.

19. A fault detection system comprising:
a plurality of sensors disposed in one or more vehicle systems of an aerospace, marine or land-based vehicle, each of the plurality of sensors being configured to detect a predetermined characteristics of the aerospace, marine or land-based vehicle and generate a plurality sensor signals corresponding to the predetermined characteristic; and
a processor in one or more of the vehicle systems, the processor being configured to receive the plurality of sensor signals from the plurality of sensors, the processor being configured to
threshold the plurality of sensor signals for each respective sensor in substantially real time,
identity transient instabilities in the dynamics of the plurality of sensor signals by determining abnormal derivative frequency values for each of the plurality of thresholded sensor signals in substantially real time, where the transient instabilities are within a predetermined normal operating range of the one or more sensors, and
determine an operational status of at least each of the one or more vehicle systems based on the abnormal derivative frequency values and communicate the operational status of the one or more sensors to an operator or crew member of the vehicle.

20. The fault detection system of claim 19, wherein the processor is further configured to
generate a time series of abnormal derivative frequency values;
transform the time series of abnormal derivative frequency values into abnormal derivative frequency vectors by time shifting, with overlapping time steps, a time window having a predetermined size across the time series of abnormal derivative frequency values; and
classify the abnormal derivative frequency values for each of the plurality of thresholded sensor signals as being normal or abnormal,
wherein the processor is configured to predict, based on classified abnormal derivative frequency values, an impending fault in a component of the one or more vehicle systems in which a respective one of the one or more sensors is located.

\* \* \* \* \*